(No Model.)

J. K. O'NEIL.
HORSESHOE.

No. 246,545. Patented Aug. 30, 1881.

WITNESSES

INVENTOR,
John K. O'Neil,
By his Attorney,

UNITED STATES PATENT OFFICE.

JOHN K. O'NEIL, OF TROY, NEW YORK.

HORSESHOE.

SPECIFICATION forming part of Letters Patent No. 246,545, dated August 30, 1881.

Application filed January 7, 1881. (No model.)

*To all whom it may concern:*

Be it known that I, JOHN K. O'NEIL, of Troy, in the county of Rensselaer and State of New York, have invented an Improved Horseshoe; and I do hereby declare that the following is a full and exact description thereof, reference being had to the accompanying drawings, making part of this specification—

Figure 1:
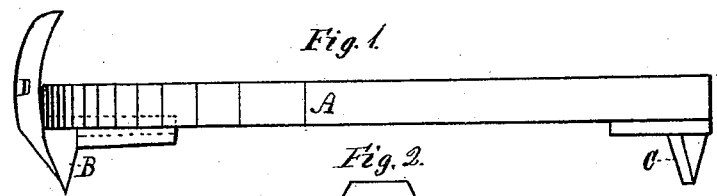
Figure 2:
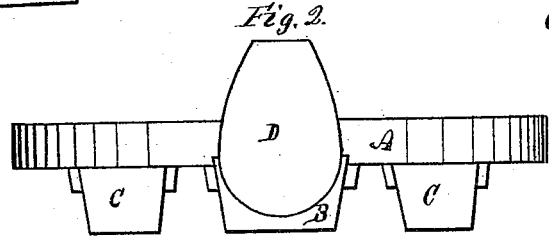
Figure 3:
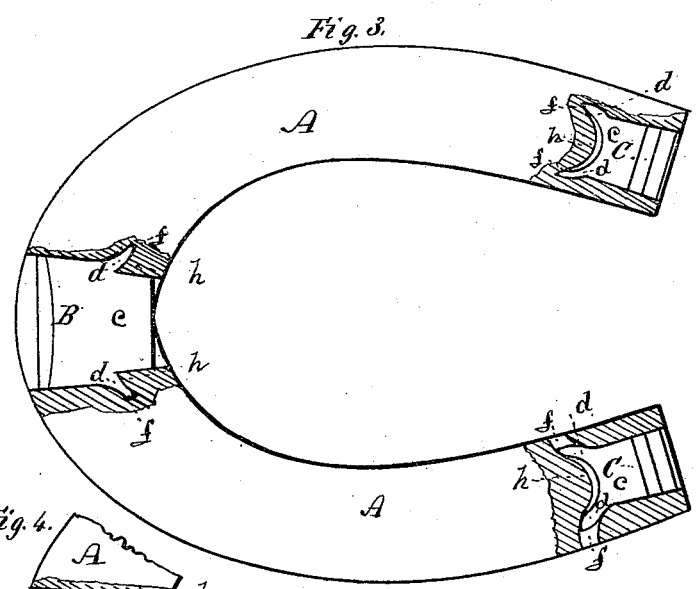
Figure 4:
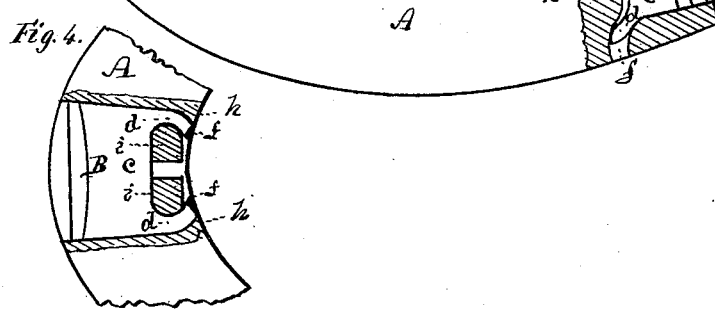

Figure 1 being a side edge view of a horseshoe provided with my improvements; Fig. 2, a front view of the same; Fig. 3, a view of the under side of the horseshoe, the covers or arches of the calk-sockets being cut away; Fig. 4, a partial under view, showing the arch of the toe-calk socket cut away and representing a modified mode of securing the calk in the socket.

Like letters designate corresponding parts in all of the figures.

Let A represent the body of the horseshoe, B the toe-calk, and C C the heel-calks.

My improvement consists in the means by which I secure removable toe and heel calks to the body of the horseshoe.

In a previous application for Letters Patent, which are about to issue, I have shown and described a covered socket to hold the shank of a toe-calk fitting therein and a removable key or pin to hold the calk in the socket.

In my present invention I employ a holding-socket, as in the said former application, to receive the shank of the calk; but I employ a different means of securing the same removably in the socket. Instead of a separate key, I employ one or more prongs of iron on the shank *c* of the calk, as shown at *d d* in Fig. 3. These prongs or projections are to be so formed and arranged that they will not interfere with the insertion of the shank of the calk in its socket; and I form one or more lateral cavities or depressions, *f f*, in the body of the shoe, next to the inner surfaces of the socket, either above, below, or at the sides of the socket-space, and shaped to receive and arranged to correspond in position with the said prongs or projections *d d* of the calk to be inserted in the socket; and the directions in which these cavities lie are such that as the calk is driven into the socket the prongs may be directed and forced into the corresponding cavities, and thereby turned aside sufficiently to retain the calk in the socket till forcibly driven out by purposed means, which, when it is desired, can readily be effected by a blow or two direct against the inner side of the calk, or by a punch inserted, when made accessible, to drive the bent prongs out of their cavities. This is a very secure method of fastening, cheap and not liable at all to get out of order, since the fastening parts are entirely inclosed and liable to no violence. The heel-calks in Fig. 3 show the same method of fastening, but having a slightly different arrangement and specific construction from that shown for the toe-calk in the same figure.

Fig. 4 shows another arrangement of the prongs, to turn inward toward each other, and of corresponding cavities to receive them. This is such that a punch may be introduced in the back of the socket to help bend or clinch the prongs, and the punch or any suitable instrument may be also used to straighten out the prongs for removal of the calk at any time. In this case deflectors *h h* are formed to turn the prongs inward, just as in the other forms, above described. Similar deflectors are used to turn the prongs outward. Where the prongs turn inward instead of outward, as in the last case described, suitable bosses or projections, *i i*, Fig. 4, are situated in the socket, for the prongs to clinch and hold around. As shown, there are two bosses, with a space between for convenience in inserting a punch to drive out the calk from the socket; but one boss will serve for one socket.

What I claim as my invention, and desire to secure by Letters Patent, is—

1. A removable calk provided with one or more flexible prongs, *d*, in combination with a horseshoe-body provided with a socket to receive the calk, and one or more cavities, *f*, to receive the prongs of the same deflected therein when securing the calk in its socket, substantially as and for the purpose herein specified.

2. In combination with a calk provided with one or more prongs, *d*, a horseshoe-body provided with a socket to receive the calk, and with one or more bosses, *i*, around which the prongs are deflected, substantially as and for the purpose herein specified.

The foregoing specification signed by me.

JOHN K. O'NEIL.

Witnesses:
E. A. WELCH,
J. H. LOTTRIGE.